(Model.)
G. RENICK & J. A. CURTIS.
TWO WHEELED VEHICLE.
No. 279,809. Patented June 19, 1883.
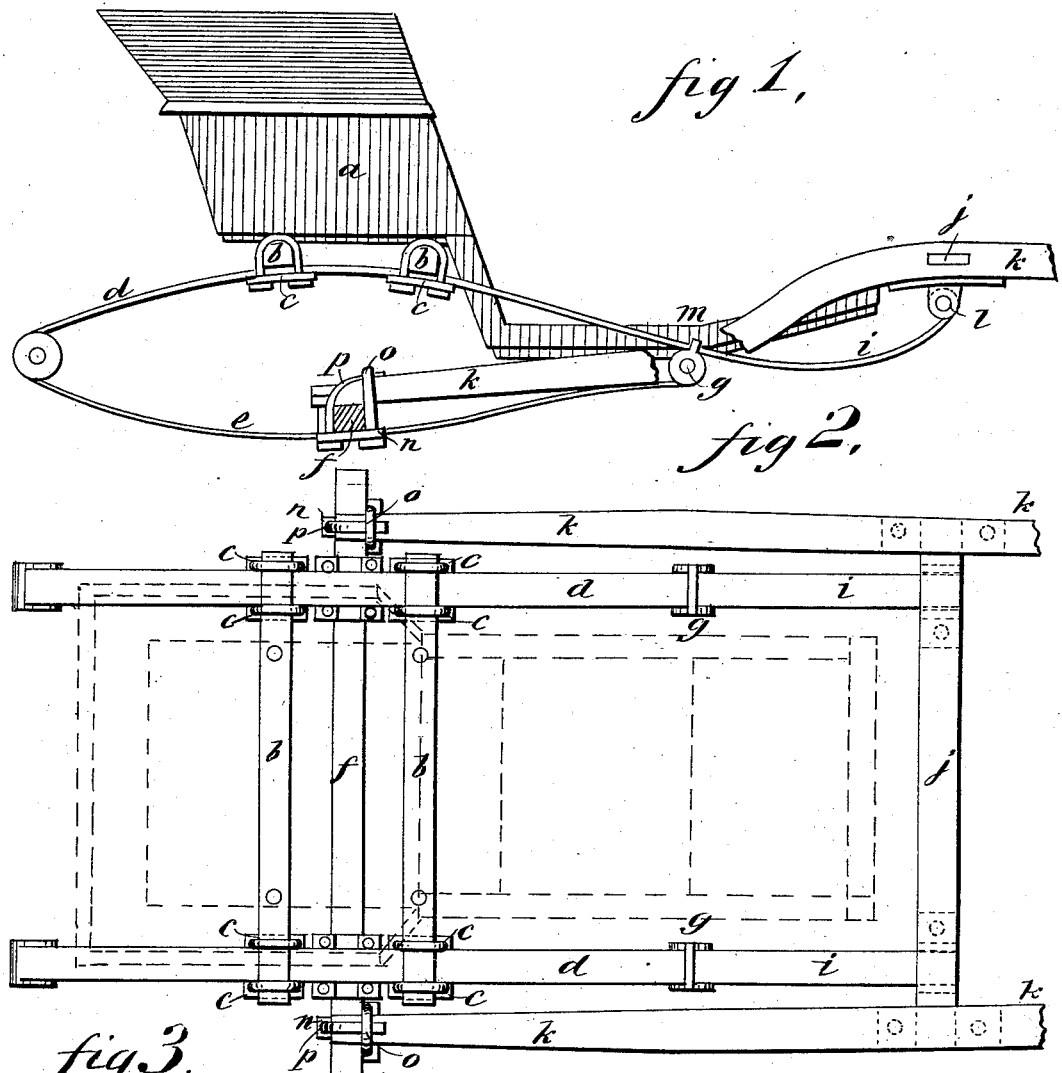
WITNESSES:
Chas. T. Howell,
C. Sedgwick
INVENTOR:
G. Renick
J. A. Curtis
BY Munn & Co
ATTORNEYS.

UNITED STATES PATENT OFFICE.

GASPER RENICK AND JAMES A. CURTIS, OF GREENCASTLE, INDIANA.

TWO-WHEELED VEHICLE.

SPECIFICATION forming part of Letters Patent No. 279,809, dated June 19, 1883.

Application filed April 5, 1883. (Model.)

*To all whom it may concern:*

Be it known that we, GASPER RENICK and JAMES A. CURTIS, of Greencastle, in the county of Putnam and State of Indiana, have invented a new and Improved Road-Cart, of which the following is a full, clear, and exact description.

The object of the invention is to improve the construction of road-carts, as hereinafter described, and pointed out in the claims.

Reference is to be had to the accompanying drawings, forming part of this specification, in which similar letters of reference indicate corresponding parts in all the figures.

Figure 1 is a transverse section of the axle and side elevation of the body, shafts, and springs, except a portion of one of the shafts broken out. Fig. 2 is a plan view with the body shown in dotted lines. Fig. 3 is a plan of the clip-plate by which the shafts are secured to the axle. Fig. 4 is a section of the axle. Fig. 5 is a side elevation of a portion of the axle and a section of the lower member of the spring, showing the clip by which the spring is secured to the axle. Fig. 6 is a side elevation of the device by which the front ends of the long members of the springs are connected to the cross-bar of the shafts, and Figs. 7 and 8 are details of the connecting device for the short and long members of the springs.

The body $a$ of the cart is connected to the parallel cross-bars $b$, which are secured by clips $c$ to the upper members, $d$, of a pair of elliptic springs, located at the sides of the body, respectively, and connected by the lower members, $e$, to the axle $f$ by clips $h$, the said springs being connected at their middle, or thereabout, to the axle. Instead of joining the two members of the springs together in the usual manner at the front end, we prolong the upper members and connect them by a shackle, $g$, attached to the end of the lower member, and through which the upper member passes, so as to be capable of longitudinal motion independently of the connecting-joint. From the shackle $g$ the part $d$ is prolonged by the extension $i$ to the cross-bar $j$ of the shafts $k$, to which it is connected by the shackle $l$, which makes such connection of the body to the shafts as is required to stay the body against forward and backward thrusts, and at the same time avoids the swing of the body forward and backward on the axle, commonly caused by the up-and-down swing of the shafts by the horse.

It is to be noticed that the seat is so adjusted with relation to the axle that its center is a little back of the axle, in order that the weight of the rider will be a little more on the rear part than on the front part of the springs, for affording freer action of the extensions $i$ in relieving the body of the motions of the horse than if pressed down more by the weight of the load.

The body has a foot-board extension, $m$, projecting forward in the space between the side springs and their extensions and the cross-bar and shafts, which is free from connection with the shafts or cross-bar, thereby avoiding the swing it would communicate to the seat if connected.

For connecting the shafts $k$ to the axle we propose to employ the T-plate $n$, yoke $o$, and the bent bolt $p$, which are made fast by clamping the yoke down on the upper part of the bolt, which is bent up over the curved end of the shaft under the axle-yoke $o$, to be held by said yoke.

Having thus described our invention, we claim as new and desire to secure by Letters Patent—

1. The bent bolt $p$, combined with a plate, $n$, and yoke $o$, to hold a shaft to an axle, as shown and described.

2. The elliptic side springs for supporting the body, connected at the middle, or thereabout, to the axle, and having an extension of the upper member beyond the front end of the lower member, said members being connected by a shackle allowing longitudinal motion of each with relation to the other, substantially as described.

GASPER RENICK.
JAMES A. CURTIS.

Witnesses:
JOHN C. ALBIN,
ROBERT RENICK.